Feb. 21, 1956 H. SENGEBUSCH 2,735,891

TELEPHONE PAYSTATION MECHANISM

Filed Dec. 5, 1951 3 Sheets-Sheet 1

*INVENTOR.*
HANS SENGEBUSCH

*BY* Mc Walter Owen.

ATTY.

Feb. 21, 1956 H. SENGEBUSCH 2,735,891

TELEPHONE PAYSTATION MECHANISM

Filed Dec. 5, 1951 3 Sheets-Sheet 2

INVENTOR.
HANS SENGEBUSCH

BY Wm. Walter Owen

ATTY.

Feb. 21, 1956 H. SENGEBUSCH 2,735,891

TELEPHONE PAYSTATION MECHANISM

Filed Dec. 5, 1951 3 Sheets-Sheet 3

INVENTOR.
HANS SENGEBUSCH
BY Wm. Walter Owen
ATTY.

United States Patent Office 2,735,891

Patented Feb. 21, 1956

2,735,891

TELEPHONE PAYSTATION MECHANISM

Hans Sengebusch, Chicago, Ill., assignor to Automatic Electric Laboratories, Inc., Chicago, Ill., a corporation of Delaware Application December 5, 1951, Serial No. 259,961

6 Claims. (Cl. 179—6.3)

Figure 1:
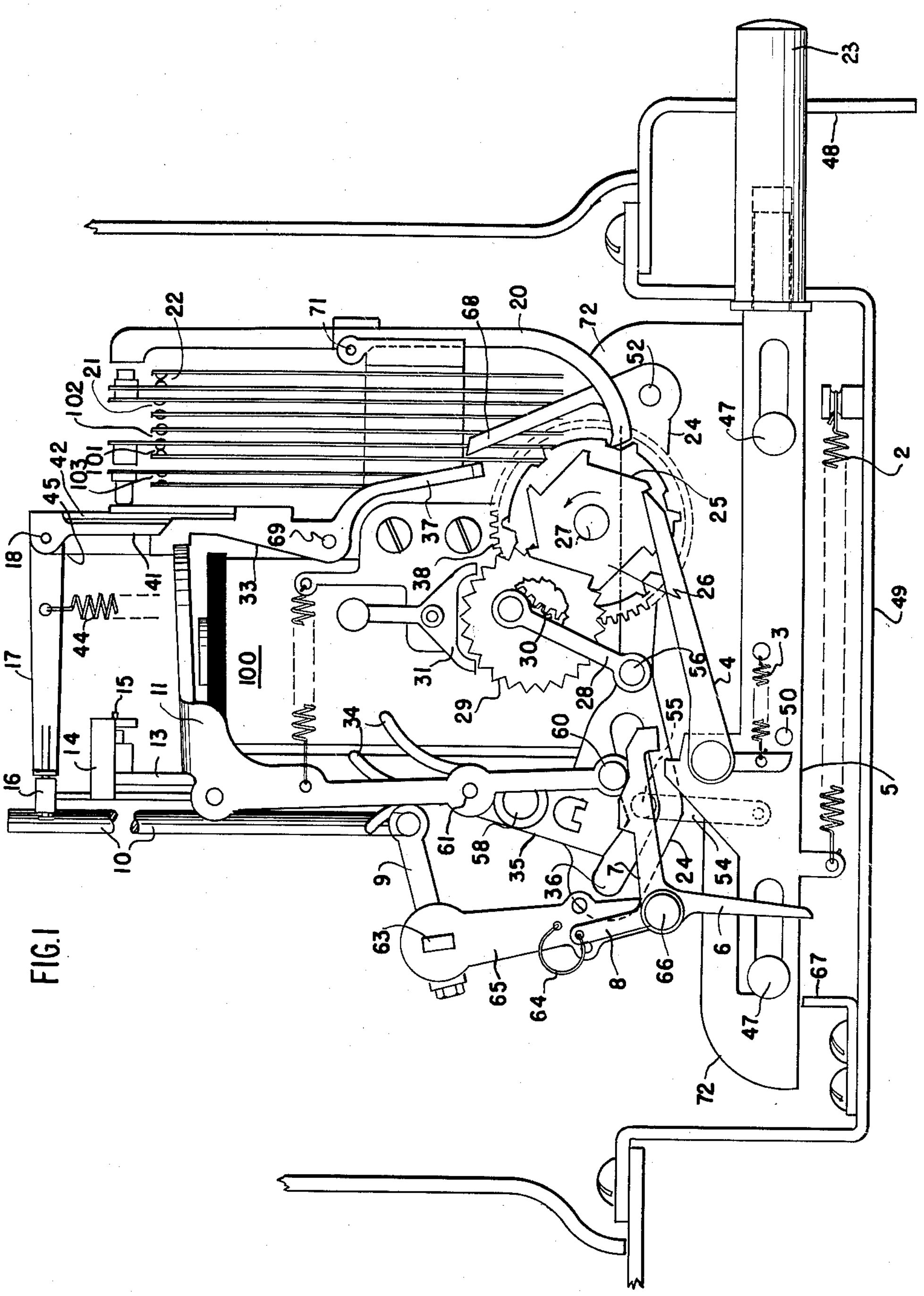

This invention relates to telephone systems and more particularly to prepay telephone paystation mechanisms.

Heretofore, prepay paystations have had a coin magnet connected between the line and ground during conversation which has a tendency to cause a transmission loss and to unbalance the line. Previously this coin magnet required 110 volts coin control battery for collecting and refunding deposited coins. This relatively high voltage had to be supplied by the central office and in small exchanges where the cost of central office equipment must be charged against a small number of paystations the 110 volt coin control battery equipment has been found somewhat expensive with the result that in some instances postpay paystations have been used instead because they require no refunding equipment.

Another problem has been the inability of the coin magnet, even operating at 110 volts and drawing a heavy current, to handle large amounts of money and it has often been necessary on toll calls to collect a part of the toll even before a connection has been established. Postpay paystations also have disadvantages. Occasionally on local calls, the called party will answer and the calling party will be slow to deposit a coin, in which case, finding no one on the line, the called party will hang up and when the calling party finally does deposit his coin it is too late and the coin is wasted since there is no mechanism to refund it. On a toll call, if a mistake occurs, or if the operator and the calling party disagree on the amount already deposited, there is no way for the operator to refund the coins so that they may be redeposited and recounted. For these reasons postpay paystations, though cheaper, are less convenient for subscribers.

The illustrated mechanism, operating in conjunction with the new circuit disclosed and claimed in the copending application, Serial No. 229,051, filed May 31, 1951, by Clarence E. Lomax, eliminates the weaknesses of each type.

One of the objects of this invention is to provide a mechanism for a prepay paystation which requires no 110 volt coin control battery.

Another object of this invention is to provide a mechanism which will derive power for collecting coins from the weight of the telephone handset rather than from a 110 volt electromagnet which has heretofore been employed for that purpose.

Another object is to provide a mechanism which will derive power for refunding coins from the return stroke of a push key.

Another object is to render the above push key ineffective to refund coins if a call is answered.

A further object is to cause the release of the connection if the push key is pressed before the call is answered but not if it is pressed after the call is answered.

A further object is to make it possible, by pressing the key, to refund either before or after hanging up.

One feature of this invention is a push key for refunding coins.

Another feature is a polarized magnet which is connected in series with the line during dialing but which is shunted during conversation.

Another feature of this invention is mechanical means for causing the refund or collection of coins.

Another feature is a means for signalling the toll operator when a subscriber refunds his coins by pressing the push key.

A further feature is the inclusion of a pair of coin operated contacts which are opened when a coin is deposited and restored when the coin is refunded or when a called party answers.

A further feature is a positioning means whereby the polarized magnet disables the push key from refunding the coins, once the called party has answered, and makes a linkage to the hookswitch effective to collect the coins when the hookswitch is later depressed.

A still further feature is a means for releasing the above positioning means when the coin is collected.

Another feature of this invention is an escapement mechanism which delays the refunding operation until the line connection has been broken.

In this mechanism, the power furnished by depressing the hookswitch, either manually or by placing the handset on the hook, is used only for collecting coins, refunding power being supplied by pressing a push key. There is no timing device associated directly with the hookswitch and a quick flash of the hookswitch will cause the coins to be collected if the called party has answered on a local call or if the operator has reversed battery on a toll call. Flashing the hookswitch before the operator has reversed battery on a toll call will open and close the line and thereby signal the operator. Since refund is effected by pressing the push key, a timing device is connected to it to prevent a subscriber, once his connection has been established but before the called party has answered, from refunding his coins and still keeping his connection. The timing device delays the coins from being refunded until the switch train has released.

This device may be used in connection with a coin receiving mechanism which requires more than one coin to be deposited to open the dial shunting springs, however a single coin mechanism is shown in the illustration as one embodiment of the invention.

Briefly, the operation of this invention is as follows:

The trigger, hopper, and coin slots are of the conventional type but the coin trap is operated by a lever instead of by a pair of coin magnets as before. A coin deposited in the coin slot hits the trigger to which a pair of dial shunting springs are mechanically linked. When the trigger is struck by the coin, these shunt springs are opened and the subscriber may dial, the coins meanwhile being arrested and suspended above the hopper on the coin trap. If the subscriber hangs up before the called party answers, the connection is released but the coins are left suspended until the refund key is pushed.

Pushing the key forces a sliding member behind it to slide horizontally against the tension of a spring. On the return stroke of this member which is retarded by a timing device, a pawl mounted on the member turns a ratchet wheel which is attached to a cam and a spur gear. The ratchet wheel, cam, and gear make ⅙ of revolution for each stroke of the pawl but the spur gear turns a pinion and pallet wheel one full revolution on each stroke. A link attached to the pinion wheel forces a slotted lever down and up and the lever, in turn, operates the refund lever.

If, on the other hand, the called party has answered, a magnet which is polarized by a rectifying shunt operates and its armature is mechanically locked in an operated position by a latch which also closed a direct shunt around the magnet so that the magnet is not in series with the line during conversation. The operation of the armature moves an arrow-shaped piece which will cause the refund lever to move in the opposite direction to refund when the slotted lever is depressed, thereby collecting the coins. To collect, however, the hookswitch, rather than the push key, through a linkage of its own moves the sliding member to the left. When the slotted lever is depressed a finger at its right end rotates the latch, releasing the armature of the magnet and opening the magnet shunt springs, the armature returning the arrow-shaped piece to its normal position. The sliding member, on its return stroke, operates the gear chain and depresses the slotted lever, operating the refund lever in the collect direction.

Figure 2:
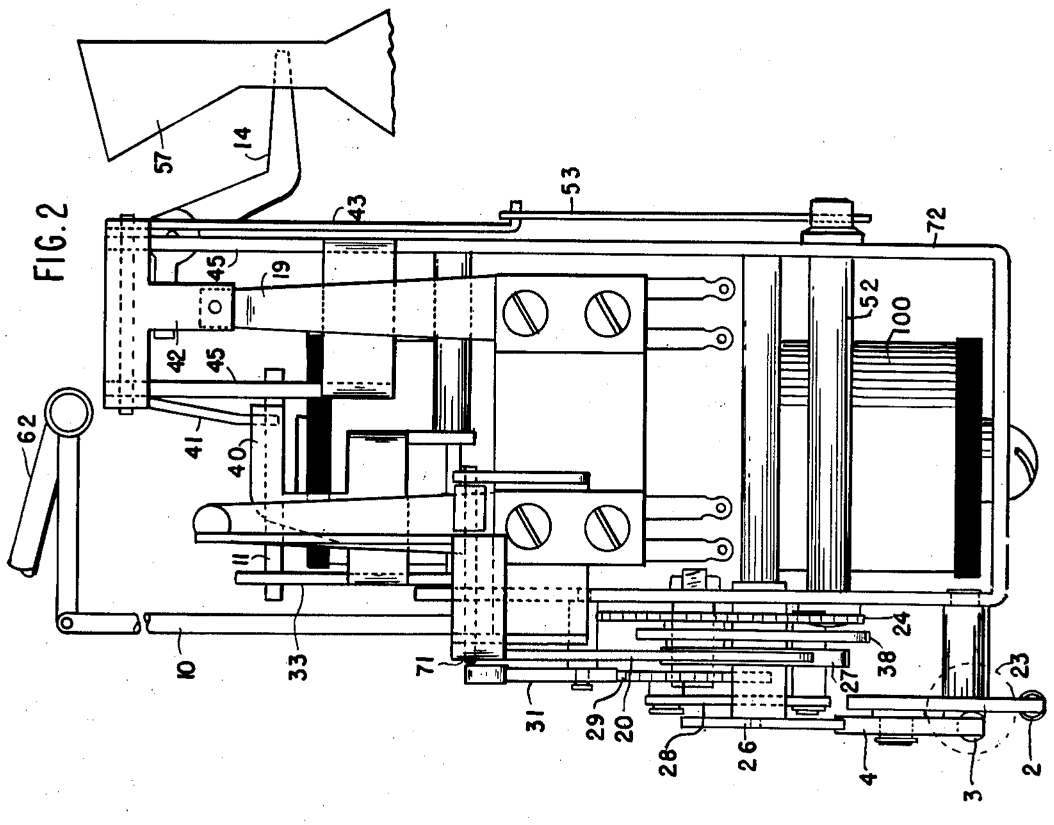
Figure 3:
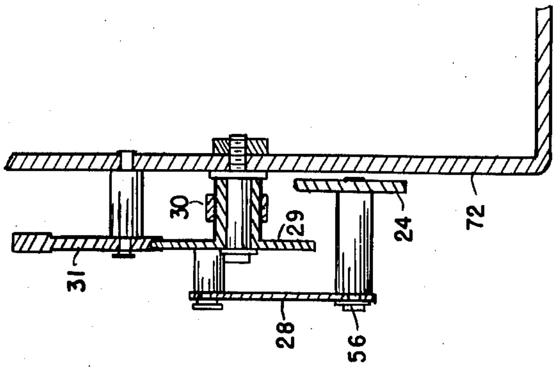
Figure 4:
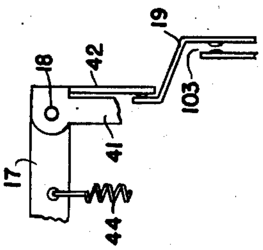
Figures 5, 6, 7:
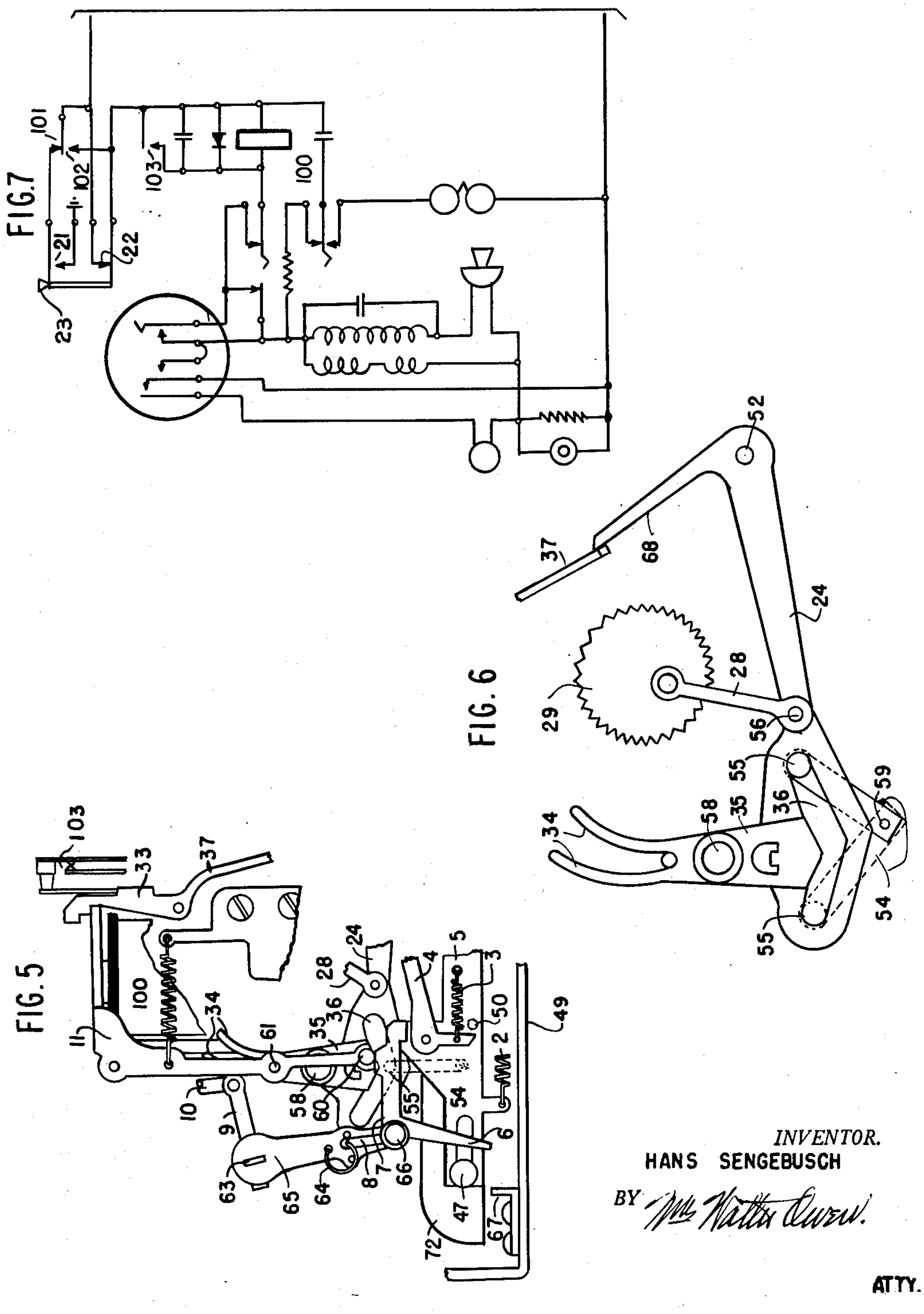

For a more detailed description of the invention reference will be made to the drawings wherein Fig. 1 is a front elevation of the device shown in a normal position, Fig. 2 a right side elevation, Fig. 3 is a sectional view as taken above the timing arrangement, Fig. 4 a partial front elevation showing how the cam springs are operated by a finger 42, Fig. 5 a partial front elevation showing the device immediately after the called party has answered, Fig. 6 a partial front elevation showing a detail of the refunding and collecting operation, and Fig. 7 a schematic diagram of the substation circuit.

To illustrate the operation of this device, I shall describe two local calls and a toll call made by a subscriber from a substation having this type of paystation. On the first call, he finds the line busy and on the second call the called party answers. This will illustrate both the refunding and collecting operations.

The coin slot mechanism generally is a prepay paystation mechanism well known in the art such as illustrated in the Forsberg, patent 1,043,219, patented November 5, 1912. The subscriber deposits a coin in a coin chute. The coin falls through main chute 57 and lands on a coin trap where it is held until refunded or collected. Assuming that this mechanism is used in connection with a dial phone, the coin will operate a trigger 14 in the main chute 57 shown in Fig. 2. When trigger 14 operates, it permits roller 16 on arm 17 to move down under tension from a spring 44 (see Fig. 1). As the arm 17 moves down, it rotates about a pivot pin 18 mounted in a support 45 and as it does so, three attached fingers 41, 42 and 43 (Fig. 2) which extend downwardly from the arm at its right end are rotated to move their free ends to the right. Finger 42 opens a pair of dial shunting springs or coin springs 19 (Fig. 4), thereby permitting the subscriber to dial. He dials, and if he gets a busy signal he may depress the hookswitch (not shown) attached to the control bar 62 (Fig. 2), thereby breaking his connection in a way well known in the art but not refunding his coin which stays on the coin trap, the shunt springs 19 remaining open. To make another call, he need only dial again. If he does not wish to make another call, he may push a push key 23 to refund his coin as described hereafter.

At the bottom of Fig. 1 is a sliding member 5 resting on a pair of rests 47 which project through slots in member 5 and on which the member may slide horizontally. Push key 23 which projects from lower housing 48 abuts against member 5 at its right end and pressure on the key causes both the key and the member to move to the left until the right hand end of the slots reach the rests 47. The pawl 4 moves to the left with member 5 until it engages the next tooth on ratchet 26. A tension spring 3 which is anchored to the sliding member 5 maintains pawl 4 in engagement with the surface of ratchet wheel 26. A stop 50 guides pawl 4.

When pressure on key 23 is released, spring 2 which is anchored to base plate 49 pulls the sliding member 5 and the key 23 back to their normal position. The pawl 4 meantime rotates the ratchet wheel 26 one-sixth of a revolution. The ratchet wheel is securely mounted on a spur gear 38 which is in mesh with a pinion carry a pallet wheel 29 and a link 28. Pin 56 connects the lower end of link 28 to a lever 24 which pivots on axle 52. When ratchet wheel 26 and spur gear 38 make one-sixth of a revolution, pinion 30 and pallet wheel 29 make a complete revolution, driving link 28 down and up, thereby momentarily depressing the left end of lever 24 and then returning it to its normal position. The ratchet wheel, lever, and pinion wheel all are rotatably mounted on the front of a metal box 72. Restraining the pinion gear is an escapement device 31 which slows down the refunding operation long enough for a connection to be released.

Refund lever 54 has a roller 55 attached to one end thereof, as shown in Fig. 3 which is positioned to roll back and forth in a V-shaped slot 36 located in lever 24, when lever 24 is depressed. Fig. 6 shows roller 55 in solid lines at the right end of slot 36 in its refunding position with lever 24 depressed. At the left end of the slot, roller 55 and refund lever 54 are shown in dotted lines in the collecting position. When the refund lever 54 is rotated clockwise about pivot 59, it tilts the coin trap (not shown) and dumps the coin into the coin return chute, thereby refunding the coin deposited by the calling subscriber. It will be noted at this time that when the lever 54 is rotated counterclockwise from its normal vertical position, it tilts the coin trap the other way and dumps the coin into the coin collect box (not shown). When lever 24 is depressed, axle 52 to which it is firmly attached is forced to rotate counterclockwise. Finger 53 at the right end of axle 52 in Fig. 2 is rotated and strikes finger 43, lifting arm 17 thereby releasing trigger 14 and permitting the trigger 14 to return to its normal horizontal position.

Assuming now that the subscriber makes a second call, wherein he redeposits the coin, dials a desired number and the called party answers in the well-known manner. Battery is reversed to the subscriber's line due to answering and is forced to flow through magnet 100 which is in series with the line. Little current flows through this magnet in the other direction because it has a rectifying shunt which carries most of the current. When battery is reversed, this polarized magnet attracts armature 11 which has a roller 60 at its lower end and a pin 61 somewhat above the roller. On lever 24, there is rotatably mounted at point 58 an arrow-shaped piece 35 which has at its lower end a point which projects down into slot 36 of lever 24. This piece also has two horn shaped projections 34 which point upwardly from its upper end. Pin 61 of armature 11 fits between these horns and when the armature is attracted by magnet 100, the pin moves to the left, striking the left horn and rotating the piece 35 counterclockwise about point 58, thereby causing the point of the arrow to move slightly to the right of the middle of slot 36.

When armature 11 operates, a latch 33 is pushed to the left by the springs associated with contacts 102 and 103 and locks the armature in an operated position, contacts 102 and 103 being thus permitted to close and contact 101 being opened. An extension 40 of catch 33, shown in Fig. 2, contacts finger 41, lifting arm 17 and permitting trigger 14 to restore and coin contacts 19 to close. Fig. 5 shows the device in an operated position.

Attached to the switchhook control bar 62 is a vertical linking rod 10 which is rigidly connected to one end of crank 65 by a shaft 9.

At the lower end of the crank, a member having three arms 6, 7 and 8 is rotatably mounted on a pivot 66. Toggle spring 64 exerts pressure on this member to maintain it either in the right or left position. Arm 7 has a catch at its right end and a cam surface in the middle. When armature 11 is attracted, roller 60 rolls over onto this cam surface, forcing arm 7 down so that the catch engages another catch on sliding member 5. Now, when the control bar 62 is depressed, rod 10 is lowered, causing shaft 9 to rotate crank 65 clockwise about pivot 63, moving the three-armed member to the left and pulling sliding member 5 with it until arm 6 of the three-armed member reaches stop 67. As the members continue to move to the left, the three-armed member is forced to rotate about pivot 66 and the catch on arm 7 is disengaged from the catch on sliding member 5.

When member 5 is released, spring 2 causes it to slide back to the right as in the refunding operation. The other parts function in the same manner as for refund except that when lever 24 is depressed, roller 55 strikes arrow-shaped member 35 and is deflected to the left along slot 36, thereby moving the refund lever in a collecting direction.

Thus, it may be seen that once magnet 100 has operated, a coin will be collected if either the control bar 62 is depressed or the push key 23 is depressed. However, if the magnet 100 has not operated, the hookswitch linkage is inoperative because arm 7 is not engaged with member 5 and coins will not be collected by operation of the push key because the arrow-shaped member is in its normal position.

When lever 24 is depressed, a finger 68 extending upward from its right end contacts a finger 37 of catch 33 and causes it to rotate about pivot 69 in a clockwise direction, thereby releasing armature 11 which closes contacts 101 and opens contacts 102 and 103. When the armature is released, pin 61 restores the arrow-shaped member 35 to its refunding position.

Thus far, only local calls have been described but this device is also useful for making toll calls. To make a toll call, the subscriber deposits a coin and dials the operator. After dialing, he may break his connection either by hanging up or by pressing the push key and refunding his coin, providing he does so before the operator answers. Once she inserts a plug in the jack, the subscriber cannot release the connection as described in the previously mentioned Lomax application but he may still refund his coin by means of the push key.

The operator answers, asks him to refund his coin and deposit the amount of the toll. When he has done so, the operator rings the called party. If, while she is ringing, the subscriber wants to talk to the operator, he may flash the hookswitch. This will open and close the line and signal the operator. He may still refund his coins but if he presses the push key, the operator will be so informed and will not complete the connection. The warning circuit is also described in detail in the copending application by Lomax. The mechanical features involved are as follows: Rotatably mounted on a pivot 71 is a rider lever 20 one end of which rides on cam 25 and the other end of which operates two pairs of contact springs, make contact 21 and break contact 22. It is not important which contacts operate first, as long as they are not connected electrically. Push key 23 in Fig. 7 is a non-conductor. Contact 22 is in series with the line. When cam 25 is rotated during the refunding operation, rider lever 20 opens contact 22 long enough for the switch train to release in the case of a local call. Contact 21 is closed at this time, grounding the negative side of the line through break contact 101 and thereby operating a relay at the central office which operates an alarm mechanism or a light-flashing circuit to warn the operator that the subscriber has refunded.

When the called party answers, the operator will connect him to the calling subscriber unless the calling party has refunded his toll. At the same time, the operator reverses battery to the calling party's line which operates magnet 100 which in turn opens contact 101 and closes contact 102, thereby rendering the push key electrically inoperative by placing a shunt across contact 22 and opening the path from ground through contact 101. At this time, the subscriber can no longer refund his coins, but can only collect them. Lever 24 will operate catch 33 which will release armature 11, close contact 101 and open contacts 102 and 103. However battery is still reversed and the armature will be attracted since its shunt 103 is open, so the magnet will hold until finger 68 permits the catch to return to hold armature 11 and close contact 103.

The cam springs 21 and 22 will be operated during the collecting operation either when the subscriber hangs up at the end of a call or when he attempts to refund his toll during a call, but since contact 101 is open the central office relay will not operate.

It is conceivably apparent that other linkages may be included in this mechanism, thereby making it possible to use power from the hookswitch both to collect and refund coins or to make the push key perform both functions, in all cases using a series magnet with a rectified shunt to determine whether the coins are to be collected or refunded.

Having described my invention, what is considered new and desired to have protected by Letters Patent will be pointed out in the appended claims.

What is claimed is:

1. In a subscriber controlled telephone paystation mechanism, manually operable means associated with said mechanism, means for initiating the refund operation of said mechanism to refund the deposit made on a call originated by a calling subscriber, means whereby said last-mentioned means is operated responsive to the operation of said manual means by said subscriber, a receiver controlled switch hook also associated with said mechanism, means associated with said switch hook for initiating the collect operation of said mechanism to collect the deposit made on a call originated by said calling subscriber, and means whereby said last-mentioned means is operated responsive to the operation of said switch hook, when the receiver is placed thereon by said subscriber.

2. In a subscriber controlled telephone paystation mechanism, collect means associated with said mechanism, positioning means for rendering said collect means effective, a receiver controlled switch hook also associated with said mechanism, means for controlling said positioning means, means associated with said switch hook for initiating the operation of said collect means to collect the deposit made on a call originated by a calling subscriber, and means whereby said last-mentioned means is responsive to the operation of said switch hook, when the receiver is placed thereon by said subscriber.

3. In a subscriber controlled telephone paystation mechanism, refund and collect means associated with said mechanism, positioning means for rendering said refund means effective in one instance and for rendering said collect means effective in another instance, manually operable means associated with said mechanism, means for initiating the operation of said refund means to refund the deposit made on a call originated by a calling subscriber, means whereby said last-mentioned means is responsive to the operation of said manual means in said one instance by said subscriber, a receiver controlled switch hook also associated with said mechanism, means for controlling said positioning means, means associated with said switch hook for initiating the operation of said collect means to collect the deposit made on a call originated by said calling subscriber, and means whereby said last-mentioned means is responsive to the operation of said switch hook in said other instance, when the receiver is placed thereon by said calling subscriber.

4. A subscriber controlled telephone paystation mechanism such as claimed in claim 3, wherein said means for controlling said positioning means includes a single electromagnet, said electromagnet being connected in series in the connection between said calling subscriber and a called subscriber and operated responsive to a reversal of current over said connection when said called subscriber answers said call.

5. In a subscriber controlled telephone paystation mechanism, refund means associated with said mechanism, manually operable means included in said mechanism, governing means also included in said mechanism for controlling the return speed of said manual means to normal after said manual means is operated, means for operating said governing means and for initiating the operation of said refund means to refund the deposit made on a call originated by a calling subscriber, means whereby said last-mentioned means is responsive to the operation of said manual means by said subscriber, said refunding operation taking place during the time interval that said manual means is returning to normal under control of said governing means, magnetic means operated when said originated call is answered by a called subscriber, means for thereafter rendering said refund means inoperative to refund said deposit made on said call, and means whereby said last-mentioned means is responsive to said operation of said magnetic means.

6. In a subscriber controlled telephone paystation mechanism, coin refund means associated with said mechanism, manually operable means and governing means included in said mechanism, contacts associated with said mechanism and normally comprising a part of the loop circuit of a calling subscriber in an initiated signalling connection between said calling subscriber and a called subscriber, means operated by said manually operable means, when said manual means is operated by said calling subscriber, for operating said contacts to open said initiated signalling connection, in case said call has not been answered by said called subscriber, means also operated by said operated manual means for initiating the operation of said governing means to retard the return to normal of said operated manual means at a slow rate of speed, and means operated by said governing means for operating said coin refund means to effect a refund operation during the time said operated manual means is returning to normal and after said signalling connection has been opened.

References Cited in the file of this patent

UNITED STATES PATENTS

| | | |
|---|---|---|
| 1,730,422 | Hall | Oct. 8, 1929 |
| 2,248,575 | Lomax | July 8, 1941 |
| 2,270,066 | Lomax | Jan. 13, 1942 |
| 2,583,783 | Lomax et al. | Jan. 29, 1952 |